United States Patent [19]

Givens et al.

[11] 4,446,369

[45] May 1, 1984

[54] METHOD AND SYSTEM FOR RADIOACTIVE ASSAYING

[75] Inventors: Wyatt W. Givens; Linus S. Allen, both of Dallas, Tex.

[73] Assignee: Mobil Oil Corporation, New York, N.Y.

[21] Appl. No.: 310,022

[22] Filed: Oct. 13, 1981

[51] Int. Cl.³ .............................................. G01V 5/10
[52] U.S. Cl. .................................... 250/270; 250/262
[58] Field of Search ....................... 250/270, 269, 262

[56] References Cited

U.S. PATENT DOCUMENTS

| | | | |
|---|---|---|---|
| 3,780,303 | 12/1973 | Smith, Jr. et al. | 250/270 |
| 3,842,265 | 10/1974 | Pitts, Jr. | 250/270 |
| 4,066,892 | 1/1978 | Givens | 250/262 |
| 4,232,220 | 11/1980 | Hertzog | 250/270 |

OTHER PUBLICATIONS

Westaway et al., "The Gamma Spectrometer Tool Inelastic and Capture Gamma-Ray Spectroscopy for Reservoir Analysis", SPE-9461, 55th Annual Fall Tech. Conf. & Ex. of Soc. Petro. Eng. of AIME, Dallas, Sep. 21–24, 1980.

Primary Examiner—Alfred E. Smith
Assistant Examiner—Carolyn E. Fields
Attorney, Agent, or Firm—Alexander J. McKillop; Michael G. Gilman; George W. Hager, Jr.

[57] ABSTRACT

A subsurface formation is irradiated with pulsed neutrons and both inelastic scattering and capture gamma-rays are measured in energy level bands characteristic of sulfur and iron. Differentials are determined between such inelastic scattering and capture gamma-rays for both the sulfur and the iron. The iron differential is then compensated by a select multiple of the sulfur differential. The ratio of the compensated iron differential and the sulfur differential is taken as a measure of the pyrite content of the formation.

2 Claims, 3 Drawing Figures

METHOD AND SYSTEM FOR RADIOACTIVE ASSAYING

BACKGROUND OF THE INVENTION

A number of methods are known and have been made commercially available in the well logging art for studying the radioactive properties of subsurface formations, both where the radioactivity is natural and where it is artificially induced. Logs of such properties aid immeasurably in the study of the nature of the subsurface formation, particularly in exploration for mineral or petroleum deposits of such quantities as to make them commercially inviting. One such method relates to the analysis of the energy spectrum of gamma radiation artificially produced in formations adjacent a borehole.

SUMMARY OF THE INVENTION

In accordance with the present invention, a subsurface formation traversed by a borehole is irradiated with bursts of neutrons sufficient to induce inelastic scattering gamma-rays from selected elements of material present in such formation during first time periods coinciding with the bursts of neutrons. Gamma-rays resulting from such irradiation are measured during such first time periods. Gamma-rays are also measured during second time periods occurring between the bursts of neutrons and during which inelastic scattering gamma-rays from the selected elements are not expected to be produced. The differential in the gamma-ray count during such first and second time periods is determined as a representation of the presence of the selected element of material in the formation.

In another aspect, the gamma-rays are counted during such first and second time periods within an energy band surrounding an energy level characteristic of inelastic scattering gamma-rays for the selected element of material.

In a further aspect, gamma-rays are counted during such first and second time periods within a plurality of energy bands surrounding energy levels characteristic of inelastic scattering gamma-rays from a plurality of selected elements of material. Differentials are determined in the gamma-ray counts of such plurality of energy bands during such first and second time periods as representations of the plurality of selected elements of materials. At least one ratio for such differentials is determined as a representation of the presence in the formation of a compound containing such plurality of selected elements in said at least one ratio.

DESCRIPTION OF THE PREFERRED EMBODIMENT

Figure 1:
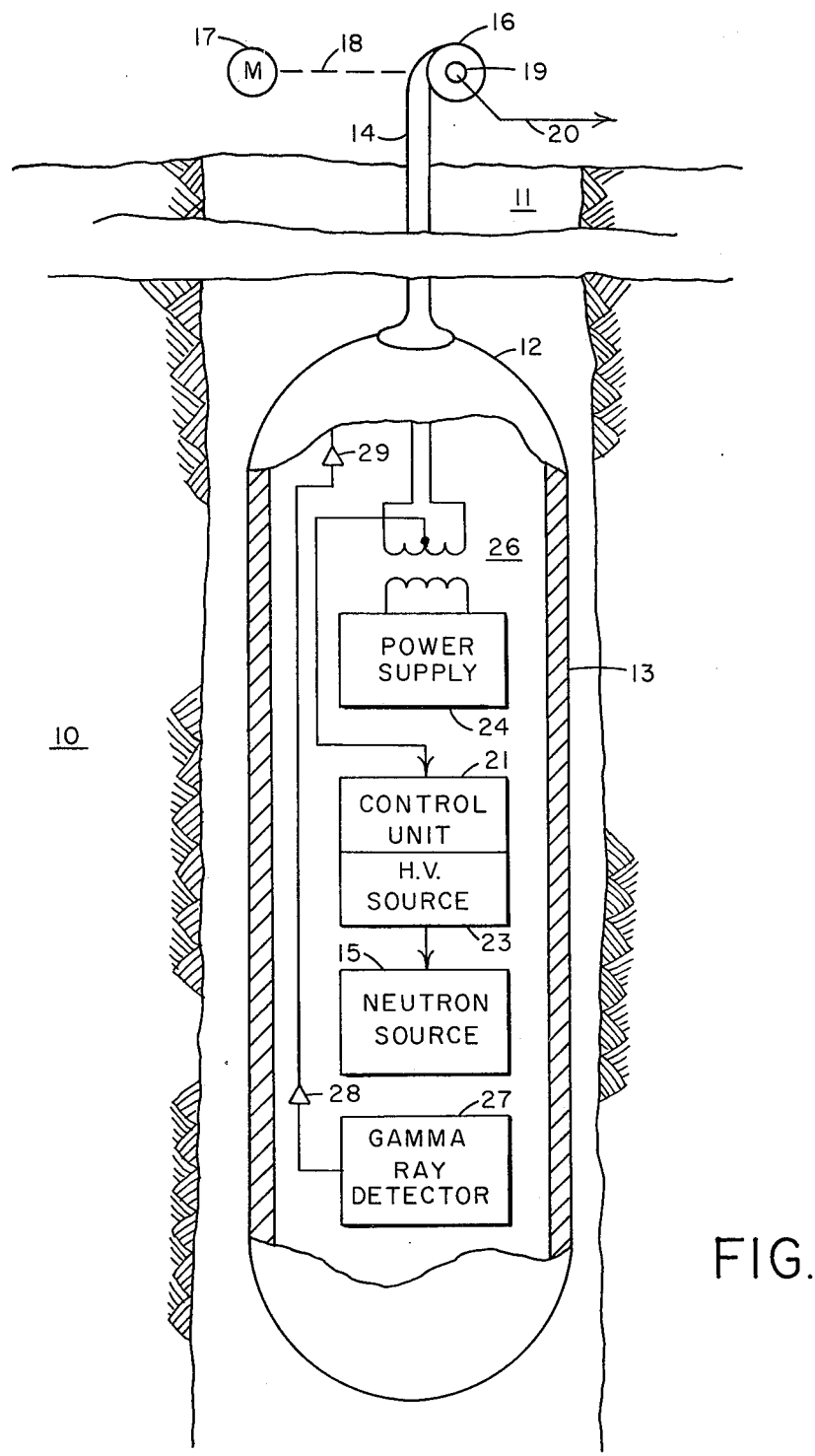
FIG. 1 illustrates the gamma radiation borehole assay system of the present invention.

The present invention is directed to a borehole assay method and system by which information concerning selected elements of material present in subsurface formations can be measured in-situ. Referring to FIG. 1, there is illustrated a borehole assay tool for carrying out the assay operation of the present invention. The formation to be investigated or assayed is shown at 10. It is traversed by a borehole 11. Assaying is carried out by lowering the assay tool 12 into the borehole to the level of the formation 10. The assay tool 12 comprises a housing 13 which is suspended in the borehole 11 by means of a logging cable 14 and in which the neutron source 15 and the gamma-ray detector 27 are located. The cable 14 is driven from the drum 16 by the motor 17 and the connection 18. Slip rings 19 and brushes 20 are employed to couple the conductors of cable 14 to the recording system of FIG. 3.

In one embodiment, the neutron source 15 is a relatively moderate energy deuterium-deuterium source producing neutrons of about 2.5 to 2.56 MEV. Pulsing of the neutron source 24 is carried out in response to a trigger pulse supplied by the uphole system. The output of the neutron generator tube is a burst of fast neutrons spaced in time for irradiation of the formation 10. More particularly, a control unit 21, in response to pulses from an uphole time base generator, controls the application of high voltage pulses to the ion source of the neutron tube in the neutron source 15. High voltage source 23 provides a d.c. voltage to the target of the neutron tube. The pulse rate may be in the order of 5 to 20 kilohertz and the duration of each pulse in the order of 1 to 10 microseconds.

Power for the remaining electronics of the assay tool is supplied by the downhole power source 24. Power to this downhole source is supplied from the uphole power source by way of the downhole transformer 26. For simplicity, connection is not shown between the downhole power source 24 and the other downhole electronics.

The gamma-ray detector 27 is preferably a bismuth germanate high-Z scintillator of the type supplied by Harshaw Chemical Company. Other suitable detectors would be the sodium iodide scintillator or the cesium iodide scintillator, on a germanium solid-state photon detector. Such detector is utilized to measure the gamma-rays emitted from the surrounding borehole formation 10 when irradiated with neutrons from the 2.5 MEV neutron source 15. The output of gamma-ray detector 27 is applied uphole by means of a preamplifier 28 and amplifier 29.

For purposes of example, the selected element or elements to be investigated may include sulfur and iron. With a neutron source energy level of 2.56 MEV, the production cross-section for 0.847 MEV gamma-rays from any $^{56}Fe$ present in the formation being assayed is $859\pm69$ millibarns and the production cross-section for 2.23 MEV gamma-rays from any $^{32}S$ present in the same formation is $173\pm16$ millibarns. Should an Fe-S compound be present, such as pyrite $FeS_2$ for example, there will be two S atoms for each Fe atom and the production cross-section for the 2.23 MEV gamma-rays from $^{32}S$ in the $FeS_2$ relative to the 0.847 MEV gamma-rays from $^{56}Fe$ would be 346 millibarns which is less than half that of the 0.847 MEV gamma-rays from $^{56}Fe$.

Most earth formations contain some amounts of hydrogen which has an absorption cross-section of 333 millibarns for thermal neutrons which produces 2.23 MEV capture gamma-rays. Therefore, such hydrogen, when present in the formation, contributes a certain intensity of 2.23 MEV capture gamma-rays in addition to the 2.23 MEV gamma-rays produced by inelastic scattering from the $^{32}$S in the formation. Additionally, background of thermal neutron capture gamma-rays may also be present from other sources in both the 2.23 MEV and 0.847 MEV energy ranges. Such capture gamma-rays from hydrogen and other sources must be identified and the assay measurements compensated so that correct S and Fe measurements can be obtained. Such identification is carried out by the system illustrated in FIG. 3 taken in conjunction with the system timing diagrams of FIG. 2.

Figures 2, 3:
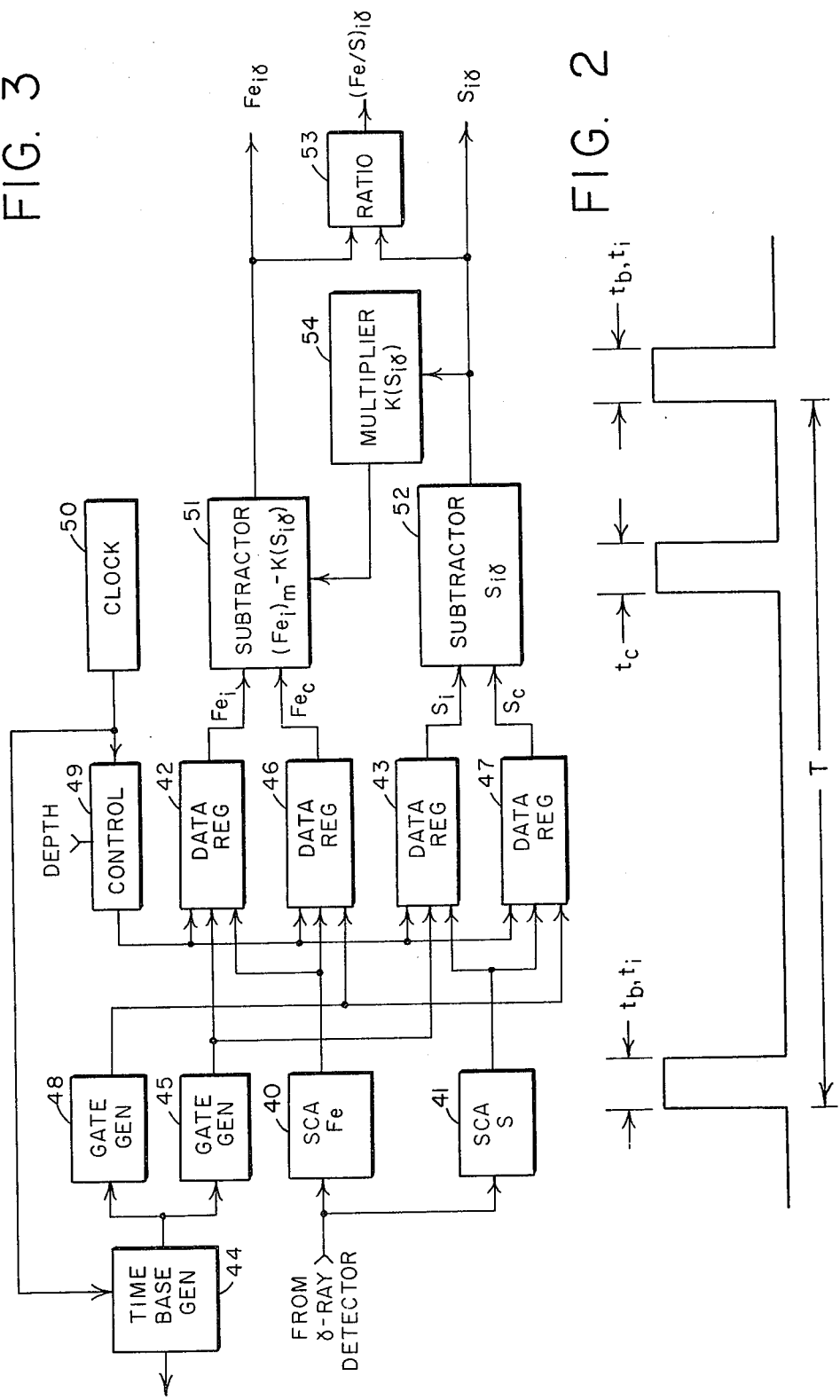
FIG. 2 is a timing diagram representative of the cyclical operation of the borehole assay system of FIG. 1.
FIG. 3 is an electrical schematic of the recording equipment for use in processing the gamma radiation measurements carried out by the borehole assay system of FIG. 1.

Referring first to FIG. 2, the neutron source is pulsed at a rate of 5 to 20 kilohertz with a pulse duration time $t_b$ of 1 to 10 microseconds, thereby providing a time interval T between bursts of 50 to 200 microseconds. The inelastic scattering gamma-rays from $^{32}$S and $^{56}$F are only produced during the neutron burst period $t_b$ and can therefore be counted during the counting time period $t_i$, such period $t_i$ coinciding with the neutron burst period $t_b$. However, the thermal neutron capture gamma-rays from hydrogen and other sources in the formation are produced in abundance within a few tens of microseconds after each neutron burst. Since the thermal neutron absorption time is greater than the time interval T between neutron bursts, the thermal neutron capture gamma-rays increase in number until an equilibrium condition exists. Under such equilibrium condition, the thermal neutron capture gamma-rays reaches a maximum and persist at a constant level until the nature of the formation changes. Therefore, by measuring such capture gamma-rays during a time period $t_c$, by measuring both the capture and inelastic scattering gamma-rays during the time period $t_i$ and subtracting the measurements within such two time periods, the correct counts from only the inelastic scattering gamma-rays from the S and Fe within the formation is obtained.

Referring now to FIG. 3, there is shown the recording system for carrying out the S and Fe assay operation of the present invention in accordance with the timing diagram of FIG. 2. Although this recording system has been described above as receiving gamma-ray measurements from the downhole assay tool of FIG. 2, the recording system could be employed as a part of the downhole tool itself, if preferred. The output of the gamma-ray detector is applied to the single channel analyzers 40 and 41. Single channel analyzer 40 is biased with an energy window set around gamma-ray pulse heights of 0.847 MEV energy levl so as to maximize the measurement of gamma-rays from the $^{56}$Fe element within the formation, while single channel analyzer 41 is biased with an energy window set around gamma-ray pulse heights of 2.23 MEV energy level so as to maximize the measurement of gamma-rays from the $^{32}$S element within the formation.

During the inelastic gamma-ray measurement period, $t_i$, the output of the Fe single channel analyzer 40 is gated to the Fe$_i$ data register 42 and the output of the S single channel analyzer 41 is gated to the S$_i$ data register 43. This gating is controlled by the time base generator 44 and gate generator 45. The time base generator 44, which activates the neutron source during the $t_b$ burst period, activates the gate generator 45 during the corresponding inelastic gamma-ray measurement period of $t_i$.

During the capture gamma-ray measurement period $t_c$ the output of the Fe single channel analyzer 40 is gated to the Fe$_c$ data register 46 and the output of the S single channel analyzer 41 is gated to the S$_c$ data register 47. This gating occurs as the time base generator 44 activates the gate generator 48 during the gamma-ray measurement period $t_c$.

After a few bursts of the neutron sources the gamma-ray count in the Fe$_i$ L data register 42 will be the sum of the inelastic and capture gamma-rays from the Fe and background elements in the formation during the $t_i$ counting periods (i.e., Fe$_i$ and Fe$_c$) and the count in the Fe$_c$ data register 46 will be the capture gamma-rays from the background elements in the formation during the $t_c$ counting periods (i.e., Fe$_c$).

the sum of the inelastic and capture gamma-rays from the S, hydrogen, and background elements in the formation during the $t_i$ counting periods (i.e., S$_i$ and S$_c$) and the count in the S$_c$ data register 47 will be the capture gamma-rays from the hydrogen and background elements in the formation during the $t_c$ counting periods (i.e., S$_c$).

Data registers 42, 43, 46 and 47 are controlled to accummulate gamma-ray counts over a desired depth interval during the assay operation. This control is provided by the control unit 49 which activates and clears the data registers in response to depth signals from the assay tool's depth encoder (not shown). Such depth intervals may typically be ½ foot, 1 foot, etc. Control unit 49 may be further controlled from the clock 50 so as to permit the gamma-ray count in the data registers to be cleared at desired time intervals so as to provide gamma-ray counts per unit time.

Upon being cleared from the data registers 42 and 46, the Fe and Fe$_c$ gamma-ray measurements are transferred to the subtractor 51 which operates to subtract the two Fe gamma-ray measurements for the $t_i$ and $t_c$ time periods and thereby provide a measured response (Fe$_i$)$_m$ in Fe energy interval from inelastic gamma rays for the desired depth interval or time interval. Likewise, the S$_i$ and S$_c$ gamma-ray measurements are cleared from data registers 43 and 47 and transferred to subtractor 52 which operates to subtract the two S gamma-ray measurements for the $t_i$ and $t_c$ time periods and thereby provide a net S$_{i\gamma}$ measurement in the S$_i$ energy interval from inelastic gamma-rays for the desired depth interval or time interval.

However, the net (Fe$_i$)$_m$ gamma-ray measurement at this point consists of gamma-rays of 0.847 MEV energy level from Fe and also of a Compton background due to any higher energy inelastic gamma-rays that may be detected, such as Compton interactions due to the 2.23 MEV inelastic gamma-rays from S. The Fe and S single channel analyzers, 40 and 41 are set in the energy interval of the respective photoelectric full energy peaks. Compton interactions from the 2.23 MEV S gamma-rays produce a continuum from zero to about 2 MEV. The net S count for a given detector will be directly proportional to the S contribution in the Fe energy interval. Hence, the net amount of iron present in the formation, Fe$_{i\gamma}$, is:

$$Fe_{i\gamma} = (Fe_i)_m - K(S_{i\gamma}) \qquad (1)$$

where K is a constant determined experimentally, for example, by calibrating the tool in an Fe free calibration model. Consequently, the net S$_{i\gamma}$ output of subtractor 52 is fed to a multiplier 54 which then applies the K(S$_{i\gamma}$) signal to the subtractor 51 to permit the determination of the true net amount of iron Fe$_{i\gamma}$ present. These Fe$_{i\gamma}$ and S$_{i\gamma}$ gamma-ray measurements are then applied to the ratio detector 53 which operates to provide a (Fe/S)$_{i\gamma}$ signal representative of any pyrite present in the formation. With pyrite present, the Fe$_{i\gamma}$ and S$_{i\gamma}$ ratio is a constant that is characteristic of pyrite. An increase during assay operations in the $(Fe/S)_{i\gamma}$ ratio is indicative of excess iron in the form of other iron bearing compounds, while a decrease in the $(Fe/S)_{i\gamma}$ ratio is indicative of excess sulfur in the form of other sulfur bearing compounds.

From these $Fe_{i\gamma}$, $S_{i\gamma}$ and $(Fe/S)_{i\gamma}$ signals the absolute amounts of iron and sulfur, the maximum amount of pyrite and the excess of iron or sulfur relative to pyrite can be readily determined from proper assay tool calibration and further data processing.

Various modifications to the disclosed embodiment of the present invention, as well as alternate embodiments, may become apparent to one skilled in the art without departing from the scope and spirit of the invention as hereinafter defined by the appended claims.

We claim:

1. A system for assaying a formation traversed by a borehole for pyrite comprising:
   a. a borehole tool,
   b. means for locating said borehole tool adjacent a zone of interest within said formation,
   c. a neutron source located within said borehole tool for irradiating said zone of interest with bursts of neutrons of energy sufficient to produce gamma-rays from inelastic neutron scattering in sulfur and iron,
   d. a gamma-ray detector located within said borehole tool for measuring gamma-rays returning to the borehole in response to irradiation of said zone of interest by said bursts of neutrons from said neutron source,
   e. means for producing a first count of those gamma-rays measured by said detector during first time periods coinciding with the time periods of said bursts of neutrons from said source and which occur within a first energy band surrounding an energy level characteristic of sulfur, said first count being a count of inelastic scattering gamma-rays from sulfur present in said zone of interest and of capture gamma-rays from hydrogen and other background elements in said zone of interest,
   f. means for producing a second count of those gamma-rays measured by said detector during said first time periods which occur within a second energy band surrounding an energy level characteristic of iron, said second count being a count of inelastic scattering gamma-rays from iron present in said zone of interest and of capture gamma-rays from hydrogen and other background elements in said zone of interest,
   g. means for producing a third count of those gamma-rays measured by said detector during second time periods occurring between said first time periods which occur within said first energy band, said third count being a count of capture gamma-rays from hydrogen and other background element in said zone of interest,
   h. means for producing a fourth count of those gamma-rays measured by said detector during said second time periods which occur within said second energy band, said fourth count being a count of capture gamma-rays from hydrogen and other background elements in said zone of interest,
   i. means for determining a first differential in said first and third counts, said first differential being representative of sulfur present in said zone in interest,
   j. means for determining a second differential in said second and fourth counts, said second differential being representative of iron present in said zone of interest,
   k. means for determining a third differential of a multiple of said first differential representing the higher energy level of gamma-rays from sulfur and said second differential representing the lower energy level gamma-rays from iron, and
   l. means for determining the ratio of said first and third differentials, said ratio being representative of the presence of pyrite in the formation, whereby an increase in said ratio during logging operations is indicative of excess iron in the form of an iron-bearing compound other than pyrite and a decrease in said ratio is indicative of excess sulfur in the form of a sulfur-bearing compound other than pyrite.

2. A method of assaying for pyrite material in formations adjacent a borehole, comprising the steps of:
   a. irradiating the formations surrounding said borehole with bursts of moderate energy neutrons from the deuterium-deuterium reaction sufficient to produce inelastic scattering gamma-rays characteristic of sulfur and iron elements during first time periods coinciding with the time periods of said bursts of neutrons,
   b. counting gamma-rays during said first time periods within energy bands surrounding the energy levels of 2.23 MEV and 0.847 MEV characteristic of inelastic scattering gamma-rays for said sulfur and iron elements respectively,
   c. counting gamma-rays within said energy bands during second time periods occurring between said first time periods and during which inelastic scattering gamma-rays characteristic of said sulfur and iron elements are not expected to be produced,
   d. determining the differential in the gamma-ray counts of said energy bands during said first and second time periods as a representation of said sulfur and iron elements,
   e. correcting the differential gamma-ray count of the 0.847 energy band of iron with a multiple of the gamma-ray count of the 2.23 MEV energy band of sulfur, whereby the effects of gamma-rays in the higher sulfur energy level band on the lower iron energy level band is minimized, and
   f. determining the ratio of the corrected lower iron energy level differential gamma-ray count and the higher sulfur energy level differential gamma-ray count, whereby a representation of the presence in the formation of pyrite containing said iron and sulfur elements in said ratio is made.

* * * * *

UNITED STATES PATENT AND TRADEMARK OFFICE
CERTIFICATE OF CORRECTION

PATENT NO. : 4,446,369
DATED : May 1, 1984
INVENTOR(S) : Wyatt W. Givens and Linus S. Allen It is certified that error appears in the above-identified patent and that said Letters Patent are hereby corrected as shown below:

Col. 3, line 15, "$^{56}$F" should read --$^{56}$Fe--.

Col. 4, line 4, "Fe$_i$L" should read --Fe$_i$--;

line 11, before "the sum of the inelastic and capture . . .", the following should appear as the beginning of a new paragraph: --The gamma-ray count in the $S_i$ data register 43 will be--.

Signed and Sealed this

Sixteenth Day of October 1984

[SEAL]

Attest:

GERALD J. MOSSINGHOFF

Attesting Officer

Commissioner of Patents and Trademarks